United States Patent

Kallenbach et al.

[11] Patent Number: 5,079,444
[45] Date of Patent: Jan. 7, 1992

[54] METHOD AND APPARATUS FOR PRODUCING A NON-LINEAR INTERACTION BETWEEN TWO ELECTROMAGNETIC WAVES

[75] Inventors: Reinald Kallenbach; Claus Zimmermann, both of München; Dieter Meschede, Garching; Theodor Hänsch, München all of Fed. Rep. of Germany

[73] Assignee: Max-Planck-Gesellschaft zur Foerderung der Wissenschaften e.V., Fed. Rep. of Germany

[21] Appl. No.: 485,432

[22] Filed: Feb. 27, 1990

[30] Foreign Application Priority Data

Feb. 27, 1989 [DE] Fed. Rep. of Germany ....... 3906068

[51] Int. Cl.$^5$ ................ H01S 3/10; H03F 7/04; H04L 8/00
[52] U.S. Cl. .................... 359/328; 359/245; 359/330
[58] Field of Search ............ 350/96.14, 354, 355; 455/610, 611; 307/425, 427, 428

[56] References Cited

U.S. PATENT DOCUMENTS

| | | | |
|---|---|---|---|
| 3,644,846 | 2/1972 | Bridges et al. ...................... | 350/355 |
| 3,703,687 | 11/1972 | Maydan ............................... | 350/354 |
| 3,834,790 | 9/1974 | Macken ............................... | 307/425 |
| 3,983,406 | 9/1976 | Lax .................................... | 307/427 |
| 3,984,675 | 10/1976 | Corcoran ............................ | 350/355 |
| 4,682,053 | 7/1987 | Pickett et al. ..................... | 307/425 |
| 4,879,722 | 11/1989 | Dixon et al. ....................... | 307/427 |
| 4,885,478 | 12/1989 | Bartholomew ..................... | 307/425 |

OTHER PUBLICATIONS

Kallenbach et al; "Electro-Optic Sideband Generation at 72 GHz"; Appl. Phys. Lett., vol. 54, No. 17, pp. 1622-1644, 4/24/89; Abst. only applied.
Sesho et al; "High Frequency Fabry Perot Phase Modulator"; Appl. Opt. vol. 26, #9, pp. 1693-1695, 5/1/87; Abst. only provided.

*Primary Examiner*—Nelson Moskowitz
*Attorney, Agent, or Firm*—Nields & Lemack

[57] ABSTRACT

Method and apparatus for producing a non-linear interaction between two electromagnetic waves, e.g. a laser beam and a microwave beam, in a non-linear optical medium, wherein one wave passes through a predetermined region of the medium in a zig-zag path, and the other traverses the predetermined region of the non-linear medium in two opposed directions in such a manner that an interaction-production phase-matching of the two waves is obtained not only in the departing but also in the approaching segments of the zig-zag path.

10 Claims, 3 Drawing Sheets

METHOD AND APPARATUS FOR PRODUCING A NON-LINEAR INTERACTION BETWEEN TWO ELECTROMAGNETIC WAVES

BACKGROUND OF THE INVENTION

1. Field of the Invention

The present invention relates to non-linear optics and more specifically to electro-optical modulators for highest frequencies.

2. Description of the Related Art

An electro-optical light-modulator for the modulation of the 0.633 μm-radiation of a He-Ne-laser with the 311-μm-radiation (964 GHz) of a HCN-laser in a LiNbO$_3$-crystal is known from a publication of I. P. Kaminow, et al., *Applied Physics Letters*, 16, No. 11, June 1, 1970, pages 416–418. The crystal has the form of a thin platelet with parallel main surfaces. The modulating 311-μm-radiation falls through a lens perpendicular to the main surfaces through the crystal platelet, while the 0.633 μm-"carrier"-radiation enters into a narrow side of the crystal platelet at such an angle to the main surfaces that it is totally reflected once at each of the two main surfaces. The modulating radiation and the modulated radiation proceed through the crystal at such an angle with respect to each other that a phase-matching is achieved: i.e., the optical wave-front of the wave to be modulated "sees" a constant modulation-field-amplitude in the ideal case. If the amplitude of the modulation field produced in the crystal by the modulating radiation (upon which the local index of refraction of the crystal depends) would oscillate during the traversal through the crystal of the optical wavefront of the wave to be modulated, then this would lead to an undesirable obliteration of the retarding or accelerating contribution, respectively, of the modulation field.

SUMMARY OF THE INVENTION

Since in the known modulation method a non-linear interaction which causes the modulation takes place only along the path of the modulated radiation between two reflections of the modulated radiation at the main surfaces of the non-linear crystal, the non-linear interaction (and thus the extent of the modulation) are relatively small.

It is therefore an object of the present invention to improve the interaction between the modulating radiation (modulation-radiation) and the modulated radiation (carrier-radiation) or, quite generally, the non-linear interaction between two electromagnetic waves.

The invention comprehends a method for producing a non-linear interaction between two electromagnetic waves, e.g. a laser beam and a microwave beam, in a non-linear optical medium, wherein one wave passes through a predetermined region of the medium in a zig-zag path, and the other traverses the predetermined region of the non-linear medium in two opposed directions in such a manner that an interaction-producing phase matching of the two waves is obtained not only in the departing but also in the approaching segments of the zig-zag path.

Since the modulating radiation or wave in the instant method and the instant apparatus can operate along a longer path of the radiation or wave to be modulated, a substantially stronger interaction (and in the case of a modulation a substantially higher degree of modulation) can be achieved.

BRIEF DESCRIPTION OF THE DRAWINGS

Hereinafter the invention will be explained in more detail with reference to preferred embodiments with reference to the drawings, in which.

DESCRIPTION OF THE PREFERRED EMBODIMENTS

The instant invention, like the known electro-optical light modulator described by Kaminow et al., is based on a non-linear interaction between two electromagnetic waves or radiations, especially "optical" radiations in a non-linear medium, especially a non-linear optical medium, whose properties, especially the index of refraction, depends upon the amplitude of the electric vector of an electromagnetic wave. These effects are known and therefore need not be explained in any greater detail. Suitable non-linear optical media are, for example, crystals of LiNbO$_3$, LiCaO$_3$, KH$_2$PO$_4$ (KDP), KD$_2$PO$_4$ (KDDP), KTiOPO$_4$ (KTP) etc. The index of refraction of such a medium is periodically altered by a modulating beam or wave, so that a "carrier"-radiation which propagates through the medium and is to be modulated is periodically slowed down and accelerated, which results in a phase modulation of the carrier wave.

The following problem arises at high modulation frequencies: When the amplitude of the modulation field oscillates during the passage of an optical phasefront of the carrier wave through the crystal, this leads to cancellation of the retarding and accelerating characteristics of the modulation field. An optimum phase modulation takes place only when an optical wave front of the carrier wave sees a constant modulation field amplitude. Since the modulating radiation or wave and the carrier radiation or wave have in general (but not necessarily) substantially different frequencies or wavelengths, respectively, the propagation velocities in the non-linear optical medium are also different. In the known electro-optical light modulator presented by Kaminow et al. a phase matching is achieved by virtue of the fact that the carrier radiation to be modulated is led into the electro-optical crystal at such an angle oblique to the direction of propagation of the modulating radiation, that a predetermined wave front of the carrier wave sees an amplitude of constant sign of the modulating wave on its way between the two main surfaces of the crystal (i.e. between the front surface of the crystal, where the modulating wave enters, and the rear surface of the crystal). This principle of phase adaptation is also used in the instant invention.

In the instant method the carrier radiation to be modulated passes in a zig-zag path with receding and approaching segments, between the main surfaces of the crystal, and is thus modulated not only in the segments between the front and the rear surfaces, but also in the segments between the rear and the front surfaces, effectively by the modulation wave. This occurs by virtue of the fact that the modulation wave is led not only in one direction, but also in the opposite direction through a region of the nonlinear optical medium which includes at least one receding and at least one approaching segment of the radiation to be modulated. Preferably this occurs by the production of a standing wave in a resonator.

Figure 1:
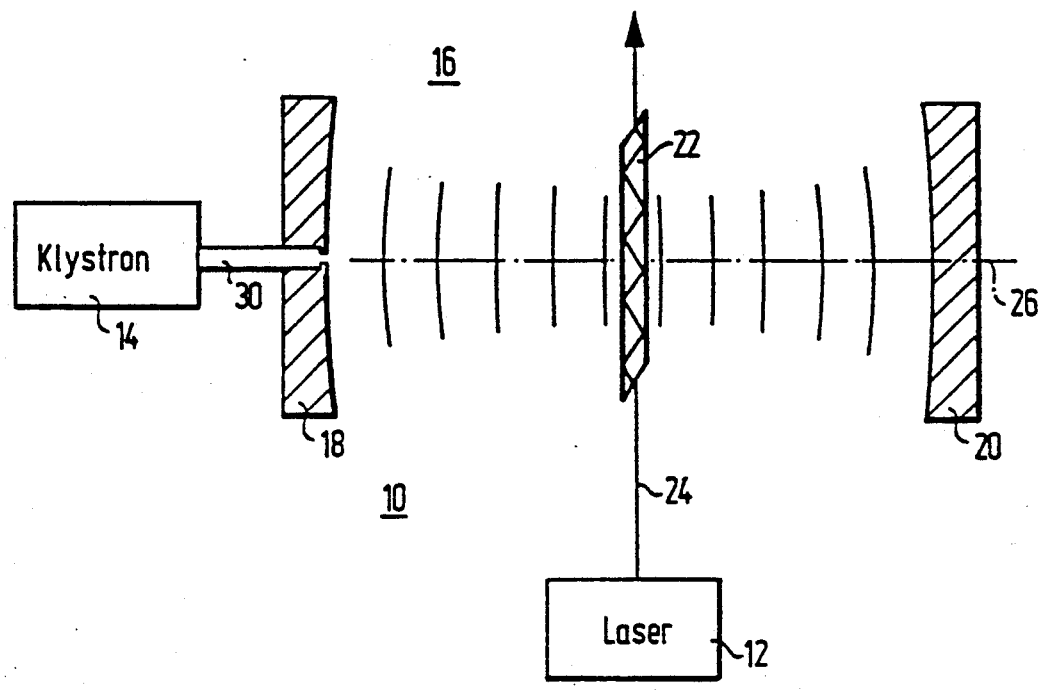
FIG. 1 is a simplified representation of an apparatus for carrying out the instant invention.

The simplified sketch in FIG. 1 shows an apparatus (10) which contains a carrier-wave source in the form of a laser (12), a modulation-wave source in the form of a klystron (14), an open resonator (16), which is bounded by two mirrors (18,20) and a non-linear optical medium in the form of a crystal (22) arranged in the resonator.

In the instant embodiment the laser (12) is a He-Ne-laser, which delivers a "carrier"-radiation beam (24) to be modulated with a wave length of 633 nm. The klystron (14) can be tunable and delivers a modulation wave with a frequency of e.g. 72 GHz corresponding to a wave length of about 4.2 mm. The mirrors (18,20) consist of copper or another suitable metal, have a radius of curvature of 100 mm and a separation of 9.2 mm, i.e. three wave lengths of the microwave radiation produced by the klystron (14) (two wave lengths in the resonator and one in the crystal corresponding geometrically to the shortened wavelength corresponding to the index of refraction). The crystal (22) consists of LiNbO$_3$ and has a thickness of 0.8 mm in the direction of the axis (26) of the resonator (16); thus equal to one microwavelength for an index of refraction of 5.3. The electro-optical crystal is arranged as a resonant etalon in the open microwave Fabry-Perot resonator (16). The laser radiation and the microwave radiation are linearly polarized and the directions of polarization are parallel to the optical axis of the electro-optical crystal (22).

Figure 2:
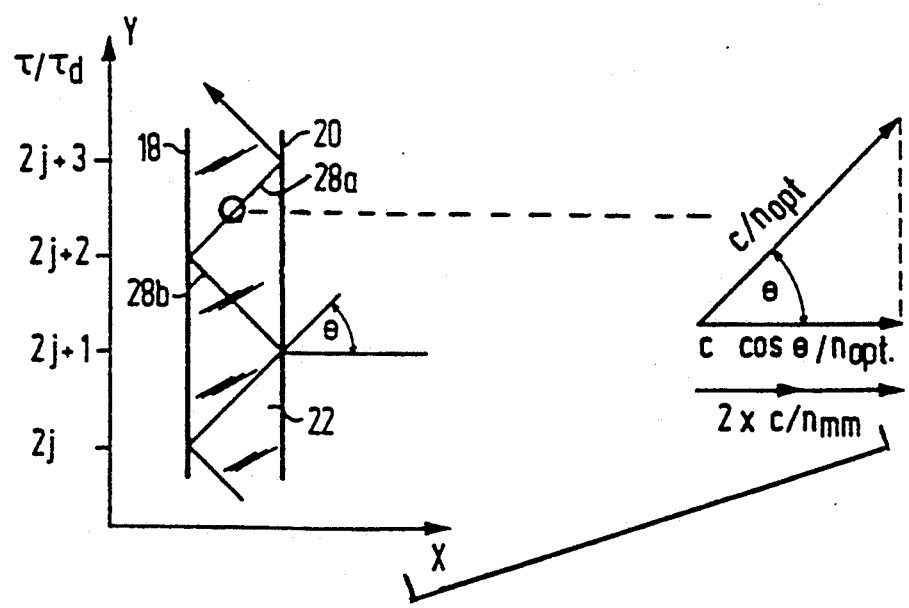
FIG. 2 is a partial view of an electro-optical crystal to which reference will be made in the explanation of the invention.

The laser beam (24) follows a zig-zag path within the crystal making use of total reflection, so that a phase-matching of the optical wave of the carrier wave (24) to the electric wave of the klystron wave is achieved. In the simplest case an optical wave front runs exactly in such a way that the projection of the optical phase velocity in the crystal (corresponding to an index of refraction $n_{opt}=2.2$ for 633 nm) upon the resonator axis (26) corresponds exactly to the very much smaller microwave phase velocity (corresponding to an index of refraction of $n_{mm}=5.3$ for 4.2 mm), as shown in FIG. 2. Thus an optical wave front of the optical carrier wave sees exactly a constant microwave field amplitude of the microwave radiation, which runs from one to the other resonator mirror, e.g. in a path segment (28a) from the mirror (18) to the mirror (20). On the other hand, the microwave which runs in the opposite direction (i.e. from the mirror (20) to the mirror (18)) oscillates rapidly with respect to the optical wavefront in this wave segment and therefore delivers no net contribution to the modulation. Moreover, in the instant apparatus the additional requirement is fulfilled, that upon the internal total reflection the optical phase-front assumes the correct phase of the microwave running in the opposite direction (i.e. in the ($-$x)-direction in FIG. 2), so that the above-explained conditions, which are true for the path segment (28a) and all segments parallel thereto with respect to the receding (positive x-direction), are also fulfilled in corresponding manner for the neighboring segment (28b) and all segments of the zig-zag path parallel thereto for the microwave wave which propagates itself in the negative x-direction. Thus all segments of the zig-zag path contribute to the modulation.

Figure 3:
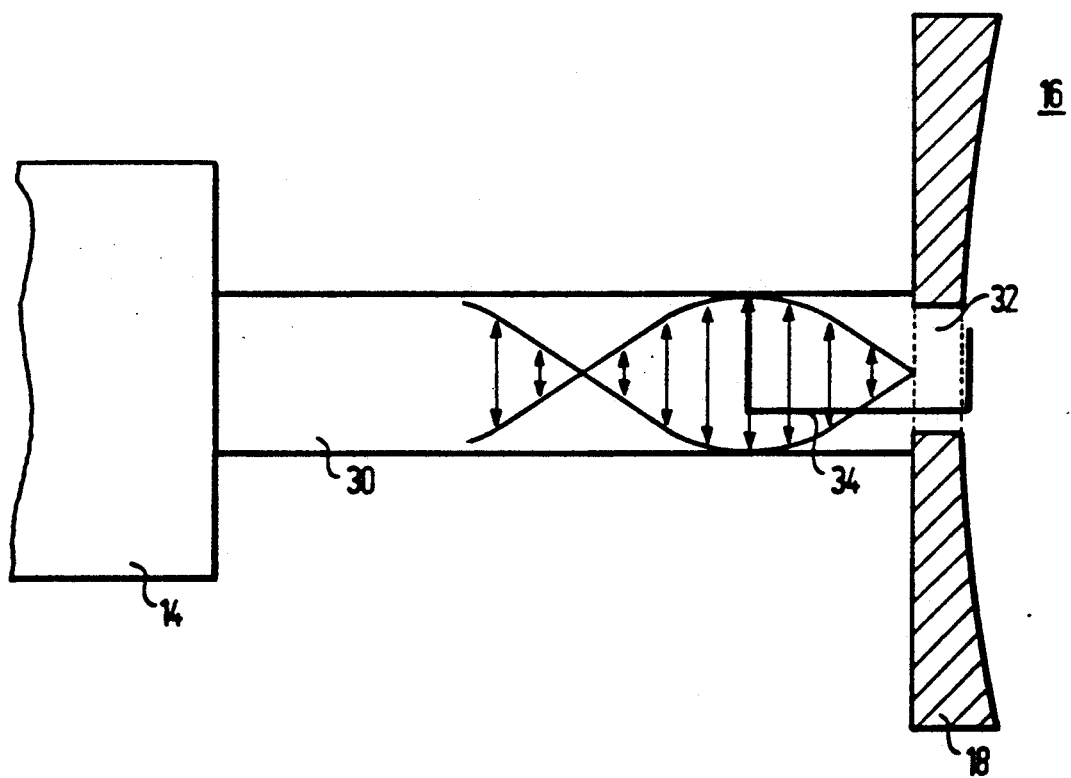
FIG. 3 is a partial view of the apparatus according to FIG. 1.

As shown in FIG. 3, the microwave radiation from the klystron (14) is coupled into the resonator (16) over a rectangular waveguide (30) and a coupling slit (32) in the mirror (18). The coupling slit has a width of 0.2 mm and a length of 1.5 mm. An antenna (34) in the form of a somewhat U-shaped wire 0.1 mm thick is used to improve the coupling. A standing wave with a maximum amplitude of the electric field E at a distance of one quarter of the waveguide wavelength from the rear wall of the mirror (18) is formed at the rear side of the mirror, which is made of copper. There one leg of the wire forming the antenna is arranged in the middle of the waveguide parallel to the electric field. The other leg of the wire forming the antenna runs along the coupling slit (32) and forms a dipole antenna, which radiates into the resonator. The position of the dipole-forming leg with respect to the coupling slit is adjusted so that a maximum coupling into the resonator is achieved.

The surfaces of the crystal (22) which extend perpendicular to the resonator axis (26) lie preferably at nodes of the electric field of the standing wave which is formed in the resonator (16). In a preferred embodiment of the invention, in this case the optical path of the laser radiation in the crystal (in which the projection of the optical phase velocity on the resonator axis (26), corresponding to the x-axis in FIG. 2, i.e. $c' = (c \cos \theta)/n_{opt}$) twice as great as the phase velocity of the microwave $c_{mn} = (c/n_{mm})$ wherein c signifies the velocity of light in vacuo, $n_{opt}$ signifies the index of refraction of the crystal for the laser radiation and $n_{mm}$ signifies the index of refraction of the crystal for the microwave radiation. The corresponding angle $\theta$ is here 38°, and therefore sufficiently above the critical angle (27° at 633 nm for LiNbO$_3$). This type of phase-matching is new and distinct from the state of the art (Kaminow et al., l.c.) The phase velocities can also differ by a factor other than 2, e.g. 3, 4, etc.; also relationships smaller than one are possible. A general theory of the phase matching may be found in the Appendix.

The radiation of the laser (12) is focused into the modulator crystal (22) with a beam-waist of 0.1 mm. This results in a confocal parameter of about 100 mm. The beam diameter is therefore small with respect to the half-microwavelength over the entire optical field, so that the phase modulation is homogenous over the beam profile. The laser beam is reflected about thirty times during one passage through the 20 mm long crystal (22), and therefore substantially more often than in the state of the art, where only a two-fold reflection occurs. In this way there results a degree of modulation of the laser beams by the microwave radiation of the klystron (14) of about 5%.

The above-described embodiment can of course be altered in the most different ways without departing from the scope of the invention. The wavelengths of the electromagnetic waves which interact with each other in the crystal (22) can be selected differently. With the instant method, for example, optical waves (especially with wavelengths in the near and medium infrared spectral range and shorter (thus e.g. smaller than about 25 or 3 $\mu$m) with waves in the wavelength region of the far infrared and longer, i.e. wavelengths from about 200 $\mu$m and with modulation frequencies up into the THz region. The optical thickness of the non-linear medium or crystal (22) can quite generally amount to a complete multiple of the half microwave length in the non-linear medium, i.e. $n_{mm}d = \lambda_{mm}N/2$, $N=1,2,3\ldots$, wherein d is the geometric thickness, $\lambda_{mm}$ the microwavelength and N an integral number. For each of these crystal thicknesses a phase-matching may be achieved, in which a constructive addition of the phase modulation in the single part-segments of the optical path results.

Figure 4:
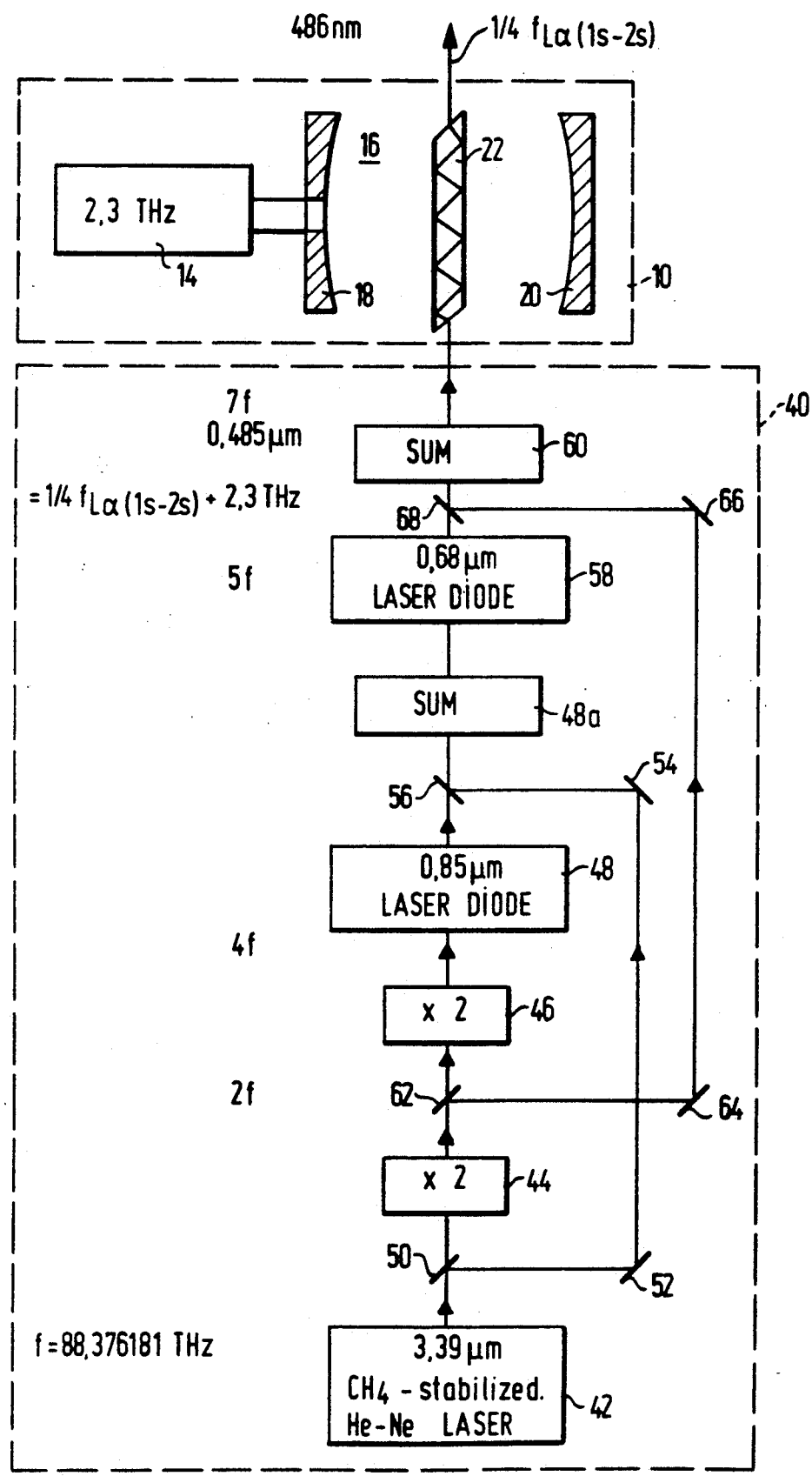
FIG. 4 is a further apparatus, which makes use of the instant method.

FIG. 4 shows the use of an apparatus (10) according to the invention in combination with a frequency chain (40) for the production of a frequency which is equal to one quarter of the frequency of the hydrogen Lyman alpha line $F_{L\alpha(1s-2s)}$.

The frequency chain (40) contains a CH$_4$-stabilized He-Ne-Laser (42), which delivers a very frequency-stable radiation with a frequency f=88.376181 THz corresponding to a wavelength of 3.39 μm. The laser radiation is doubled to 2f in a first frequency-doubler (44), and the doubled radiation is then doubled to 4f in a second frequency-doubler (46). The radiation of frequency 4f stabilizes a semiconductor laser diode (48), which emits continuous radiation of a wavelength of 0.85 μm. The radiation of the laser diode is summed in a summing apparatus (48) with the radiation of frequency f from laser (42), which is fed into the summing apparatus (48) over a beam path, which summing apparatus contains a beam splitter (50), bending mirrors (52,54) and a semi-transparent mirror (56). The radiation of the sum-frequency 5f stabilizes a second laser diode (58), which emits at 0.68 μm and this radiation is summed in a summing apparatus (60) with the frequency-doubled radiation 2f, which is led to the summing apparatus (60) over a beam-splitter (62), bending mirrors (64,66) and a semi-transparent mirror (68). The summing apparatus (60) delivers radiation of frequency 7f corresponding to 0.485 μm; this frequency lies 2.3 THz below one quarter of the frequency of the hydrogen Lyman alpha line. The radiation of frequency 7f is now led to an apparatus (10) of the type described with reference to FIG. 1 and there modulated with a frequency of 2.3 THz. The lower sideband created thereby has now exactly the desired frequency ($\frac{1}{4} f_{L\alpha(1s-2s)}$). The above-mentioned components of the frequency chain are known.

The principle described with reference to FIG. 4 may be also varied: if one couples a laser diode with the frequency 5f-2.3 THz with fixed phase to the frequency 5f, which is produced by the laser diode (58) and then adds 2f, one obtains exactly one quarter of the hydrogen frequency corresponding to 486 nm. The frequency 2f can thus be produced for example by a Er:YAP-laser, which emits at 1.7 μm and which is stabilized by the doubled frequency of the CH$_4$-stabilized He-Ne laser (42).

Having thus described the principles of invention, together with illustrative embodiments thereof, it is to be understood that, although specific terms are employed, they are used in a generic and descriptive sense, and not for purposes of limitation, the scope of the invention being set forth in the following claims.

We claim:

1. Apparatus for the modulation of a first electromagnetic wave with a second electromagnetic wave by non-linear interaction of the two waves, comprising
   (a) a first wave-generator (12) for the first wave,
   (b) a second wave-generator (14) for the second wave,
   (c) a non-linear optical medium (22), bounded by two essentially parallel surfaces, for the production of the non-linear interaction,
   (d) a first beam path going out from the first radiation generator (12) for the first wave, which runs in a predetermined direction in the non-linear medium (22), in a segment between two consecutive reflections of the first wave at the said surfaces,
   (e) a second beam path going out from the second radiation generator (14) for the second wave, which goes substantially perpendicularly through the said surfaces and occupies a predetermined cross-sectional region in the non-linear medium in which the second wave propagate in a predetermined direction of propagation,
   (f) whereby the predetermined direction of the first wave forms such an angle with the predetermined direction of propagation of the second wave, that there results a phase relationship between the two waves which causes the interaction, characterized in that:
   (g) the beam path of the first electromagnetic wave travels in a zig-zag path in the non-linear medium in the cross-section region occupied by the second wave, which zig-zag path exhibits several segments (28a, 28b) running alternately in the first direction and in a second direction between consecutive reflections at the said surfaces,
   (h) a reflecting apparatus (20) is provided in the beam path of the second wave, which acts in such a way that the second wave propagates through the non-linear medium (22) also in the direction substantially opposite to that of the said direction of propagation, and
   (i) the segments (28b) of the beam path of the first electromagnetic wave in the non-linear medium (22) which run in the second direction form such an angle with the opposite direction of propagation of the second wave that also in the second segments (28b) a phase relationship between the two waves arises which causes the interaction.

2. Apparatus according to claim 1, wherein the first wave-generator (12) delivers an optical wave with a wavelength in the infrared spectral region and shorter.

3. Apparatus according to claim 1 or 2, wherein the second wave-generator (14) delivers a wave with a wave length in the far infrared and longer.

4. Apparatus according to any one of claims 1, 2 or 3, wherein the reflecting apparatus (20) is one reflector of a resonator (16) tuned to the second electromagnetic wave, in which resonator the non-linear medium (22) is located.

5. Apparatus according to claim 4, wherein the resonator (16) is an open resonator bounded by two reflectors (18,20).

6. Apparatus according to claim 5, wherein the reflectors are metal mirrors and the second electromagnetic wave is coupled into the resonator 16 through the one reflector (18).

7. Apparatus according to any one of claims 1, 2, 3, 4, 5 or 6, wherein the non-linear medium is an optically non-linear crystal.

8. Apparatus according to any one of claims 1, 2, 3, 4, 5, 6 or 7, wherein the segments (28a, 28b) of the first electromagnetic wave which run in the first and in the second direction in the non-linear medium (22) are equally long.

9. Apparatus according to any one of claims 1, 2, 3, 4, 5, 6, 7 or 8, wherein the thickness of the non-linear medium in the direction of propagation of the second electromagnetic wave is equal to one integral multiple of the half wave length of the second electromagnetic wave in the non-linear medium.

10. Apparatus according to claim 9, wherein the non-linear medium is so arranged in a standing wave field of the second electromagnetic wave that the surfaces of the non-linear medium which run perpendicular to the direction of propagation of the second electromagnetic wave are located in wave-nodes of the electric vector of the second electromagnetic wave.

* * * * *